United States Patent [19]

Lenane

[11] 3,871,850

[45] Mar. 18, 1975

[54] FILTER ELEMENT

[75] Inventor: Denis L. Lenane, Ferndale, Mich.

[73] Assignee: Ethyl Corporation, Richmond, Va.

[22] Filed: Mar. 20, 1973

[21] Appl. No.: 343,104

[52] U.S. Cl................ 55/486, 55/DIG. 30, 55/528, 60/311, 161/154
[51] Int. Cl............................................. B01d 46/46
[58] Field of Search.............. 55/381, 382, 485–489, 55/524, 527, 528; 161/154, 50, 89; 60/311

[56] References Cited
UNITED STATES PATENTS

| | | | |
|---|---|---|---|
| 2,758,671 | 8/1956 | Silverman et al. | 55/484 |
| 2,933,154 | 4/1960 | Lauterbach | 55/486 |
| 3,476,635 | 11/1969 | Heh | 161/89 |
| 3,499,269 | 3/1970 | Bois | 55/527 |
| 3,559,810 | 2/1971 | Lee et al. | 210/499 |
| 3,649,428 | 3/1972 | Hughes | 112/420 |
| 3,815,338 | 6/1974 | Lenane | 55/528 |

OTHER PUBLICATIONS

Jones, J. I., Plastics in Filtration In Filtration & Separation, Vol. 7, No. 2, dtd 4/70, pages 160–167.
Dust Filtration with Needle Felts by Dietrich H. In Filtration & Separation, Vol. 9, No. 4, dtd 8/72, p. 438–443.

Primary Examiner—Bernard Nozick
Attorney, Agent, or Firm—Donald L. Johnson; Robert A. Linn; Joseph D. Odenweller

[57] ABSTRACT

A filter element adapted to remove fine particulates from the exhaust gas of internal combustion engines comprising a non-woven fiber mat bonded to a wire mesh. The preferred fiber mat is an aromatic polyamide mat such as poly(m-phenyleneisophthalamide) fiber mats.

1 Claim, 5 Drawing Figures

3,871,850

FILTER ELEMENT

BACKGROUND

Much effort has been made in recent years to remove particulates from the exhaust gas of internal combustion engines. These particles are formed during combustion of the fuel and contain carbonaceous material and other combustion products derived from additives conventionally used in such fuels such as those resulting from the combustion of tetraethyllead. A variety of means have been employed to remove these particulates such as the use of cyclone traps (cf, U.S. Pat. Nos. 3,056,662; 3,132,473; 3,154,389; 3,162,518; 3,197,955; 3,253,400; 3,426,513; 3,564,843 and 3,397,043) and the use of filters (cf, U.S. Pat. Nos. 3,421,315, 3,100,146 and 3,154,389).

SUMMARY OF THE INVENTION

According to the present invention a filter element is provided comprising a wire mesh having a non-woven fiber mat bonded to at least one surface of said mesh by filaments extending through the openings of said mesh. The fiber used in the mats can be inorganic or organic having a melting point above about 350°C. and which is resistant to decomposition in engine exhaust gas. The wire mesh gives the required mechanical strength enabling the element to withstand the severe physical abuse to which such elements are exposed when used in engine exhaust gas systems.

DESCRIPTION OF THE PREFERRED EMBODIMENTS

A preferred embodiment of this invention comprises a non-woven fiber mat made from a fiber having a melting point above about 350°C. (662°F.) bonded to at least one surface of a wire screen or similar wire mesh.

Figure 1:
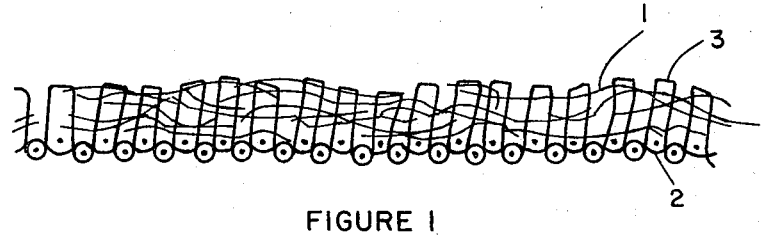
FIG. 1 is a cross-section of a non-woven fiber mat sewn to a metal screen.

Referring to FIG. 1, a non-woven fiber mat 1 is sewn to a wire screen 2 by filament or thread 3 which extends through the openings in screen 2. The fiber mat can be made of organic or inorganic fibers which have a melting point above about 350°C. For example, the mat may be made of glass fibers. Another very useful class of fiber mats are those made of aromatic polyamides melting above about 350°C. such as:

poly(4,4'-diphenylene terephthalamide)
poly(3,3'-dimethyl-4,4'-diphenylene terephthalamide)
poly(ethylene terephthalamide)
poly(4,4'-methylenediphenylene terephthalamide)
poly(4,4'-diphenylene isophthalamide)
poly(4,4'-methylenediphenylene isophthalamide)
poly(trimethylene terephthalamide)
poly(m-phenylene isophthalamide)
poly(ethylene-N,N'-dimethylterephthalamide)
poly(3,3'-dimethyl-4,4'-methylenediphenylene terephthalamide)
poly(p-xylene terephthalamide)
poly(3,3'-dimethyl-4,4'-diphenylene isophthalamide)

The most preferred aromatic polyamide fiber is poly(m-phenyleneisophthalamide), which is a commercially available fiber ("Nomex," Reg. trademark, Du Pont).

Another useful class of fiber mats are those made from aromatic polyimide fibers. These are poly aromatic heterocyclicamides such as polybenzimidazole, poly(bisbenzimidazobenzophenanthroline), poly(N-phenyl-benzimidazole), polyimidazoquin azolines, and the like.

The non-woven mats are formed by laying down random fibers about 5–15 microns in diameter and at least one-half inch up to about 3 inches or more in length. Porosity may be altered by filling the initial mat with glass microfibers or asbestos. When using aromatic polyamide fibers, such filling to reduce porosity is usually not required because exceptionally good filtration of extremely fine particles is accomplished using a fairly porous filter element. Mats made of flexible aromatic polyamides are improved by a needling process in which a plurality of needle-like tools are inserted and withdrawn from the mat, serving to further entangle the filaments to make a felt-like mat.

In a further preferred embodiment the aromatic polyamide is first bonded to a coarse scrim, preferably made of the same aromatic polyamide. The mat is readily bonded to the scrim by the above needling process. Such fabric-reinforced needled "Nomex" is commercially available (Scapa Textiles Limited, England).

Figure 2:
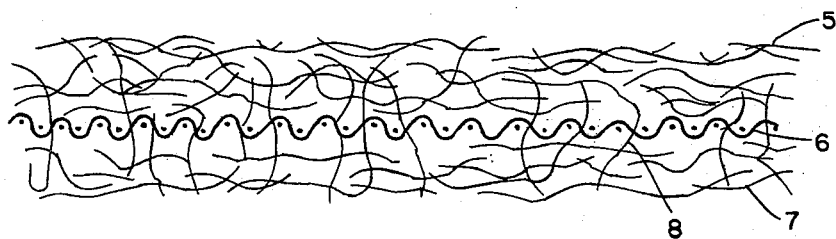
FIG. 2 is a cross-section of a metal screen having a non-woven fiber mat on both surfaces with random fibers from each mat extending through the screen into the other mat.

FIG. 2 shows an embodiment in which a non-woven fiber mat is needled to both sides of a wire mesh support. This is done by placing an aromatic polyamide fiber mat on both surfaces of a screen and repeatedly pushing through needle-like tools from both sides. The ends of the needles are adapted to carry fibers from one mat through the screen and release them in the other mat, thus securing the two mats together to form a screen sandwich. The needles can be carried on rollers and the two mats with the screen between passed between the rollers to form the needled structure. Fiber mat 5 is bonded through screen 6 to fiber mat 7 by a plurality of fibers 8 extending through the openings in screen 6 and being entangled in mats 5 and 7.

Figure 3:
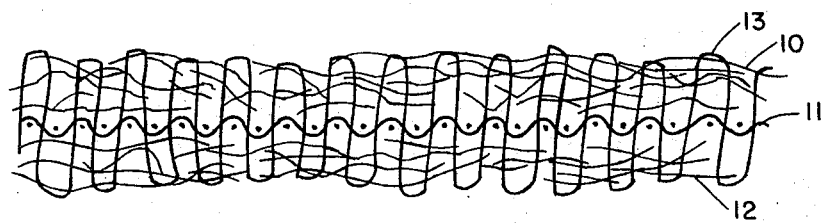
FIG. 3 is a cross-section of a metal screen having a non-woven fiber mat on both surfaces sewn together through the screen.

In FIG. 3, fiber mat 10 is sewn 13 through screen 11 to fiber mat 12.

Figure 4:
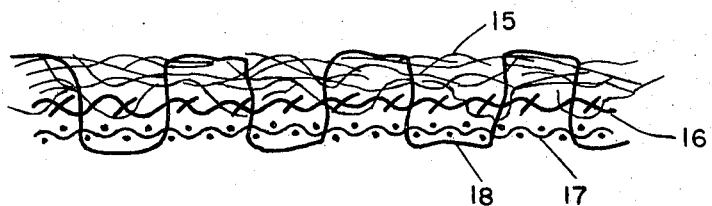
FIG. 4 is a cross-section of a metal screen with a scrim-reinforced fiber mat sewn to it.

FIG. 4 shows an embodiment in which aromatic polyamide mat 15 is needled to scrim 16, causing fibers from mat 15 to pass through and bond scrim 16 to mat 15. This is then sewn to screen 17 by thread 18 which is also made of the same aromatic polyamide, viz., poly(m-phenylene-isophthalamide).

Figure 5:
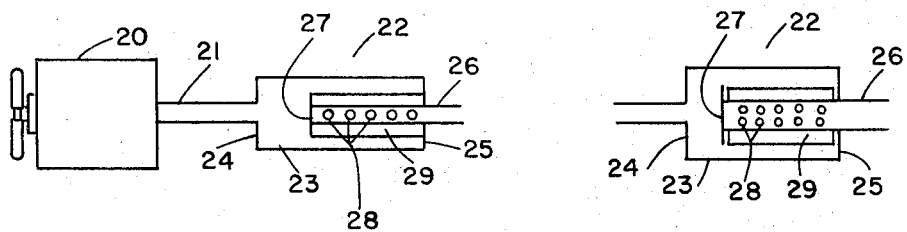
FIG. 5 is a schematic of an engine exhaust system showing in cross-section a filter unit fitted with a pleated filter element.

As mentioned earlier, the present filters are especially adapted for removing particles from engine exhaust gas. FIG. 5 shows an embodiment of this use. Engine 20 is connected by exhaust pipe 21 to filter unit 22 constructed of cylindrical housing 23 and end closures 24 and 25. Exhaust tube 26 extends axially through end closure 25 and into housing 23. Tube 26 is closed at end 27 and has a plurality of perforations 28 in its side wall. Fitted around tube 26 is cylindrical pleated filter element 29 which is made of a filter element structure of this invention.

Exhaust from engine 20 passes through exhaust pipe 21 into housing 23. It then passes through filter element 29 and perforations 28 and escapes to the atmosphere through exhaust tube 26.

I claim:

1. An exhaust system for an internal combustion engine including an exhaust gas filter, said filter comprising a filter housing having an inlet and an outlet, said inlet being operatively connected to receive the exhaust gas from said internal combustion engine, said filter housing containing a filter element disposed across said housing such that substantially all of the exhaust gas passes through said filter element in passing from said inlet to said outlet, said filter element comprising a wire mesh having non-woven poly(m-phenylene-isophthalamide) mats on both surfaces of said wire mesh sewn to each other through said wire mesh.

* * * * *